United States Patent
Mysore Shantamurthy et al.

(10) Patent No.: US 12,360,897 B2
(45) Date of Patent: *Jul. 15, 2025

(54) SYSTEMS AND METHODS TO FLUSH DATA IN PERSISTENT MEMORY REGION TO NON-VOLATILE MEMORY USING AUXILIARY PROCESSOR

(71) Applicant: Microsoft Technology Licensing, LLC, Redmond, WA (US)

(72) Inventors: Ravi Mysore Shantamurthy, Bothell, WA (US); Mallik Bulusu, Bellevue, WA (US); Tom Long Nguyen, Auburn, WA (US); Muhammad Ashfaq Ahmed, Redmond, WA (US); Madhav Himanshubhai Pandya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,949

(22) Filed: Apr. 15, 2024

(65) Prior Publication Data

US 2024/0264941 A1 Aug. 8, 2024

Related U.S. Application Data

(63) Continuation of application No. 17/406,961, filed on Aug. 19, 2021, now Pat. No. 11,983,111.

(51) Int. Cl.
*G06F 11/00* (2006.01)
*G06F 11/20* (2006.01)
(Continued)

(52) U.S. Cl.
CPC ...... *G06F 12/0804* (2013.01); *G06F 11/2053* (2013.01); *G06F 13/4027* (2013.01); *G06F 11/1612* (2013.01); *G06F 2212/1032* (2013.01)

(58) Field of Classification Search
CPC ............. G06F 11/2053; G06F 11/1612; G06F 2212/1032
(Continued)

(56) References Cited

U.S. PATENT DOCUMENTS

| | | | |
|---|---|---|---|
| 2010/0146333 A1* | 6/2010 | Yong ................... | G06F 11/1441 713/340 |
| 2010/0185896 A1* | 7/2010 | Andres ............... | G06F 11/2005 714/E11.071 |

(Continued)

*Primary Examiner* — Sarai E Butler
(74) *Attorney, Agent, or Firm* — Ray Quinney & Nebeker; James Bullough (57) ABSTRACT

A computing system that enables data stored in a persistent memory region to be preserved when a processor fails can include volatile memory comprising the persistent memory region, non-volatile memory, and a system on a chip (SoC). The SoC can include a main processor that is communicatively coupled to both the volatile memory and the non-volatile memory. The SoC can also include an auxiliary processor that is communicatively coupled to both the volatile memory and the non-volatile memory. The SoC can also include instructions that are executable by the auxiliary processor to cause the data in the persistent memory region of the volatile memory to be transferred to the non-volatile memory in response to a failure of the main processor.

20 Claims, 5 Drawing Sheets

(51) Int. Cl.
*G06F 12/0804*    (2016.01)
*G06F 13/40*      (2006.01)
*G06F 11/16*      (2006.01)

(58) Field of Classification Search
USPC .................................................. 714/1–57
See application file for complete search history.

(56) References Cited

U.S. PATENT DOCUMENTS

| | | | |
|---|---|---|---|
| 2011/0239043 A1* | 9/2011 | Vedder | G06F 1/3203 |
| | | | 714/14 |
| 2017/0147422 A1* | 5/2017 | Koktan | G06F 11/0778 |
| 2018/0276097 A1* | 9/2018 | Glenny | G06F 11/3024 |
| 2018/0364935 A1* | 12/2018 | Sundrani | G06F 11/201 |
| 2020/0034240 A1* | 1/2020 | Natanzon | G06F 11/1448 |
| 2022/0238142 A1* | 7/2022 | Suh | G06F 1/3275 |

* cited by examiner

SYSTEMS AND METHODS TO FLUSH DATA IN PERSISTENT MEMORY REGION TO NON-VOLATILE MEMORY USING AUXILIARY PROCESSOR

CROSS-REFERENCE TO RELATED APPLICATIONS

This application is a Continuation of U.S. application Ser. No. 17/406,961, filed on Aug. 19, 2021, the entirety of which is incorporated herein by reference.

BACKGROUND

Volatile memory is memory that requires power to maintain the stored information. Volatile memory retains its contents while powered on but loses its contents when the power is interrupted. Non-volatile memory is memory that can retain stored information even after power is removed.

Persistent memory has some characteristics that are similar to volatile memory and some characteristics that are similar to non-volatile memory. For example, like non-volatile memory, persistent memory can retain stored information even after power is removed. However, persistent memory is typically faster than standard non-volatile memory. In other words, access latencies associated with persistent memory are typically significantly less than with standard non-volatile memory. A non-volatile dual in-line memory module (NVDIMM) is one example of persistent memory. An NVDIMM differs from a standard dynamic random access memory (DRAM) based DIMM by maintaining its data even when power is lost.

There are several different types of processor architectures in use today, including x86 architectures and Advanced Reduced Instruction Set Computer (RISC) Machines (ARM) architectures. The x86 family of processors is based on a Complex Instruction Set Computer (CISC) architecture. In contrast, ARM processors are based on a RISC architecture.

Historically, x86 processors have been used for desktop computers and servers, and ARM processors have been used primarily for light, portable, battery-powered devices (e.g., smartphones, tablet computers, embedded systems). However, ARM processors are being used more and more for desktop computers and servers. In fact, ARM-based servers are becoming more attractive for cloud computing providers. There are several reasons for this, including the fact that ARM-based servers have low Thermal Design Power (TDP). In addition, the RISC architecture also provides a power efficient architecture coupled with good throughput for servers.

In some processor architectures (e.g., ARM-based architectures), there is a main processor and one or more auxiliary processors. The main processor can be a central processing unit (CPU). The auxiliary processor(s) can be configured to monitor the performance of the main processor. For example, the auxiliary processor(s) can be configured to monitor the health of the main processor to ensure that the main processor is operating correctly.

The main processor and the auxiliary processor(s) can be separate processors that are located on the same silicon die. For example, an ARM architecture can include a system on a chip (SoC) that includes a main processor and one or more auxiliary processors.

The term "system on a chip" (or "SoC") can refer to an integrated circuit (or "chip") that integrates a plurality of components of a computer or other electronic system. The components that are integrated into a SoC can include a main processor (e.g., a CPU), one or more auxiliary processors, and one or more memory interfaces (including a volatile memory interface and/or a non-volatile memory interface). A SoC can include other components as well (e.g., radio modems, signal processing components). SoCs are in contrast to the traditional motherboard-based personal computer architecture, which separates components based on function and connects them through a central interfacing circuit board. Whereas a motherboard houses and connects detachable or replaceable components, SoCs can integrate at least some of these components into a single integrated circuit.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is directed to a computing system that enables data stored in a persistent memory region to be preserved when a processor fails. The computing system includes volatile memory comprising the persistent memory region, non-volatile memory, and a system on a chip (SoC). The SoC includes a main processor that is communicatively coupled to both the volatile memory and the non-volatile memory. The SoC also includes an auxiliary processor that is communicatively coupled to both the volatile memory and the non-volatile memory. The SoC also includes instructions that are executable by the auxiliary processor to cause the data in the persistent memory region of the volatile memory to be transferred to the non-volatile memory in response to a failure of the main processor.

In some embodiments, the SoC can additionally comprise a volatile memory interface and a non-volatile memory interface. The volatile memory interface can communicatively couple the volatile memory to the main processor and the auxiliary processor. The non-volatile memory interface can communicatively couple the non-volatile memory to the main processor and the auxiliary processor.

In some embodiments, the SoC can further comprise a bridge. The volatile memory interface can communicatively couple the volatile memory to the main processor and the auxiliary processor via the bridge. The non-volatile memory interface can communicatively couple the non-volatile memory to the main processor and the auxiliary processor via the bridge.

In some embodiments, the persistent memory region of the volatile memory can comprise a software defined non-volatile dual in-line memory module (NVDIMM).

In some embodiments, the SoC can comprise an implementation of an Advanced Reduced Instruction Set Computer (RISC) Machines (ARM) architecture.

In some embodiments, the main processor can comprise a central processing unit (CPU). The auxiliary processor can be responsible for monitoring the CPU and ensuring that the CPU is operating correctly.

In some embodiments, the main processor and the auxiliary processor can both be included on a same silicon die from which the SoC is formed.

In some embodiments, the computing system can further comprise an interface that communicatively couples the main processor to the auxiliary processor.

In some embodiments, the volatile memory can be directly coupled to the SoC. The computing system can further comprise an additional SoC that is directly coupled to additional volatile memory. The additional volatile memory can comprise an additional persistent memory region. The instructions can be additionally executable by the auxiliary processor to cause additional data in the additional persistent memory region to be transferred to the non-volatile memory in response to the failure of the main processor.

In some embodiments, the SoC can comprise a plurality of auxiliary processors.

Another aspect of the present disclosure is directed to a system on a chip (SoC) that enables data stored in a persistent memory region to be preserved when a processor fails. The SoC includes a main processor that is communicatively coupled to volatile memory and non-volatile memory in a computing system. The volatile memory comprises the persistent memory region. The SoC also includes an auxiliary processor that is communicatively coupled to the volatile memory and the non-volatile memory. The SoC also includes instructions that are executable by the auxiliary processor to cause data in the persistent memory region of the volatile memory to be transferred to the non-volatile memory in response to a failure of the main processor.

In some embodiments, the SoC can further comprise a volatile memory interface and a non-volatile memory interface. The volatile memory interface can communicatively couple the volatile memory to the main processor and the auxiliary processor. The non-volatile memory interface can communicatively couple the non-volatile memory to the main processor and the auxiliary processor.

In some embodiments, the SoC can further comprise a bridge. The volatile memory interface can communicatively couple the volatile memory to the main processor and the auxiliary processor via the bridge. The non-volatile memory interface can communicatively couple the non-volatile memory to the main processor and the auxiliary processor via the bridge.

In some embodiments, the persistent memory region of the volatile memory can comprise a software defined non-volatile dual in-line memory module (NVDIMM).

In some embodiments, the SoC can comprise an implementation of an Advanced Reduced Instruction Set Computer (RISC) Machines (ARM) architecture.

In some embodiments, the main processor can be communicatively coupled to the auxiliary processor via a high-speed bus.

Another aspect of the present disclosure is directed to a method for enabling data stored in a persistent memory region in volatile memory to be preserved when a main processor on a computing system fails. The method is performed by an auxiliary processor that is located on a same system on a chip (SoC) as the main processor. The method includes receiving control of the computing system from the main processor in response to an error that makes the main processor inoperable. The method also includes causing the data in the persistent memory region in the volatile memory to be transferred to non-volatile memory. The method also includes causing the computing system to be rebooted after the data has been transferred to the non-volatile memory.

In some embodiments, the SoC can comprise a volatile memory interface and a non-volatile memory interface. The volatile memory interface can communicatively couple the volatile memory to the main processor and the auxiliary processor. The non-volatile memory interface can communicatively couples the non-volatile memory to the main processor and the auxiliary processor. Causing the data to be transferred to the non-volatile memory can comprise accessing the volatile memory via the volatile memory interface and accessing the non-volatile memory via the non-volatile memory interface.

In some embodiments, receiving control of the computing system from the main processor can comprise detecting an interrupt signal via an interface between the main processor and the auxiliary processor.

In some embodiments, the method can further comprise reporting error information to a baseboard management controller (BMC).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Some computing systems are configured to allocate a portion of standard volatile memory (e.g., DRAM) as persistent memory. For example, in some computing systems a portion of standard volatile memory can be designated and used as an NVDIMM. This can be referred to as a software defined NVDIMM.

One of the challenges associated with using a portion of standard volatile memory as persistent memory is that it requires host processor assistance to save data to non-volatile memory. In other words, a processor is needed to cause data that is stored in the persistent memory region within the volatile memory to be transferred to non-volatile memory. From time to time, however, a processor in a computing system can experience a catastrophic failure. When a processor experiences a catastrophic failure, the processor is unavailable to cause the data transfer to occur. Therefore, any data that is stored in the persistent memory region within the volatile memory is lost when the computing system is rebooted.

As noted above, in some processor architectures (e.g., ARM-based architectures), there is a main processor and one or more auxiliary processors. The present disclosure is generally related to techniques for using an auxiliary processor to perform a save operation in response to a failure of the main processor. More specifically, the techniques disclosed herein allow the control of execution to switch from the main processor to an auxiliary processor in communication with the main processor in response to a failure of the main processor. The auxiliary processor can then cause the transfer of data to occur from a persistent memory region within the volatile memory to non-volatile memory. In this way, the techniques disclosed herein can prevent data loss from occurring in the persistent memory region within the volatile memory when a failure occurs and the main processor becomes unavailable for use.

Advantageously, the techniques disclosed herein can be implemented using firmware. Thus, implementing the techniques disclosed herein does not require any architectural change to existing SoCs.

Figure 1:
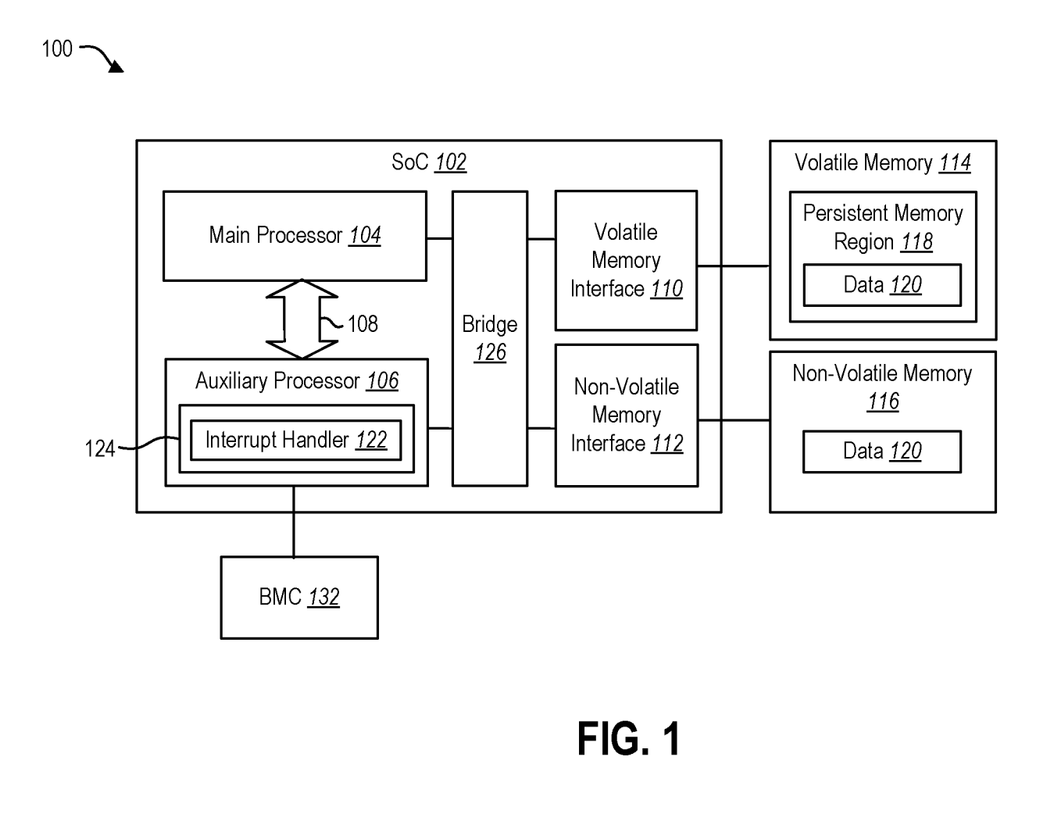
FIG. 1 illustrates an example of a computing system that can be configured to implement the techniques disclosed herein, the computing system including a system on a chip (SoC) including a main processor and an auxiliary processor.

FIG. 1 illustrates an example of a computing system 100 that can be configured to implement the techniques disclosed herein. The computing system 100 includes a system on a chip (SoC) 102 that includes a main processor 104 and an auxiliary processor 106. The main processor 104 and the auxiliary processor 106 can be separate and distinct processors. For example, both the main processor 104 and the auxiliary processor 106 can include one or more processor cores, and the processor core(s) in the main processor 104 can be separate and distinct from the processor core(s) in the auxiliary processor 106. In addition, in some embodiments the auxiliary processor 106 can have its own operating system that is separate from any operating system that is executed by the main processor 104.

The main processor 104 can be communicatively coupled to the auxiliary processor 106 via an interface 108. In some embodiments, the interface 108 between the main processor 104 and the auxiliary processor 106 can include one or more high-speed buses.

The main processor 104 can be a central processing unit (CPU). The auxiliary processor 106 can be configured to monitor the performance of the main processor 104. For example, the auxiliary processor 106 can be configured to monitor the health of the main processor 104 to ensure that the main processor 104 is operating correctly.

The main processor 104 is communicatively coupled to both volatile memory 114 and non-volatile memory 116. The auxiliary processor 106 is also communicatively coupled to both the volatile memory 114 and the non-volatile memory 116.

The SoC 102 includes a volatile memory interface 110 and a non-volatile memory interface 112. The volatile memory interface 110 can be communicatively coupled to the volatile memory 114 in the computing system 100. The non-volatile memory interface 112 can be communicatively coupled to the non-volatile memory 116 in the computing system 100.

The volatile memory interface 110 can refer to hardware and/or software component(s) that couple the main processor 104 and the auxiliary processor 106 (via the bridge 126) to the volatile memory 114. The main processor 104 and the auxiliary processor 106 can access the volatile memory 114 via the volatile memory interface 110.

The non-volatile memory interface 112 can refer to hardware and/or software component(s) that couple the main processor 104 and the auxiliary processor 106 (via the bridge 126) to the non-volatile memory 116. The main processor 104 and the auxiliary processor 106 can access the non-volatile memory 116 via the non-volatile memory interface 112. In some embodiments, the non-volatile memory interface 112 can include a computer bus that operates in accordance with an applicable bus standard, such as the Peripheral Component Interconnect Express (PCIe) standard. The non-volatile memory interface 112 can also include a hardware connector (e.g., an M.2 connector) that is configured to receive a non-volatile memory device (e.g., an M.2 solid state drive).

The volatile memory interface 110 communicatively couples the volatile memory 114 to the main processor 104 and to the auxiliary processor 106. The non-volatile memory interface 112 communicatively couples the non-volatile memory 116 to the main processor 104 and to the auxiliary processor 106.

The SoC 102 includes a bridge 126. The volatile memory interface 110 communicatively couples the volatile memory 114 to the main processor 104 and the auxiliary processor 106 via the bridge 126. The non-volatile memory interface 112 communicatively couples the non-volatile memory 116 to the main processor 104 and the auxiliary processor 106 via the bridge 126. Thus, the bridge 126 makes it possible for both the main processor 104 and the auxiliary processor 106 to access the volatile memory 114 via the volatile memory interface 110 and also to access the non-volatile memory 116 via the non-volatile memory interface 112. The bridge 126 can represent a boundary that is shared between the main processor 104 and the auxiliary processor 106. The bridge 126 may alternatively be referred to as a wrapper. In some embodiments, the bridge 126 can be implemented as a mesh and/or as a ring that communicatively couples a plurality of buses (including buses that are communicatively coupled to the volatile memory interface 110 and the non-volatile memory interface 112 and possibly one or more other interfaces as well) to the main processor 104 and the auxiliary processor 106.

A portion of the volatile memory 114 can be designated for use as persistent memory. The portion of the volatile memory 114 that is designated for use as persistent memory may be referred to as a persistent memory region 118. In some embodiments, the persistent memory region 118 of the volatile memory 114 can be configured via firmware of the computing system 100.

Volatile memory is faster than non-volatile memory, so there can be performance benefits associated with storing data 120 in the persistent memory region 118 of the volatile memory 114 compared to storing the data 120 in the non-volatile memory 116. To preserve the data 120 in the persistent memory region 118 when the computing system 100 is rebooted, a processor causes the data 120 to be transferred from the persistent memory region 118 of the volatile memory 114 to the non-volatile memory 116 before the computing system 100 shuts down or reboots. Under normal circumstances, when the main processor 104 is functioning properly, the main processor 104 can perform this function. Under some circumstances, however, the main processor 104 can experience a failure such that the main processor 104 is unavailable to perform this function.

The computing system 100 can be configured so that when an error occurs with respect to the main processor 104 and the main processor 104 becomes inoperable, control of the computing system 100 is passed from the main processor 104 to the auxiliary processor 106. In response to the failure of the main processor 104, the auxiliary processor 106 can cause the data 120 in the persistent memory region 118 of the volatile memory 114 to be transferred to the non-volatile memory 116. This transfer is possible because the volatile memory 114 still receives power even after the main processor 104 has become inoperable. Therefore, the data in the volatile memory 114 (including the data 120 in the persistent memory region 118 of the volatile memory 114) is still available even after the main processor 104 has become inoperable. Moreover, the auxiliary processor 106 is still able to access the data in the volatile memory 114 (including the data 120 in the persistent memory region 118 of the volatile memory 114) even after the main processor 104 has become inoperable.

At some point after the data 120 has been safely transferred to the non-volatile memory 116, the auxiliary processor 106 can then cause the computing system 100 to be rebooted. Once the computing system 100 has been rebooted, the data 120 can be transferred from the non-volatile memory 116 back to the persistent memory region 118 of the volatile memory 114.

Thus, one technical benefit of the depicted computing system 100 is that it enables the data 120 to be retained in the event of a failure of the main processor 104. In a computing system that only includes a main processor (and that does not include an auxiliary processor), the data in the persistent memory region would be lost when the main processor fails. This is because a processor is required to cause the data to be transferred to non-volatile memory. If the main processor of a computing system fails and the computing system does not include another processor (e.g., an auxiliary processor), then there would be no mechanism for causing the data to be transferred to non-volatile memory. Thus, the data would be lost when the computing system is rebooted. In contrast, the auxiliary processor 106 in the depicted computing system 100 can cause the data 120 in the persistent memory region 118 of the volatile memory 114 to be transferred to the non-volatile memory 116 before the computing system 100 is rebooted, thereby preserving the data 120 during the reboot.

In some embodiments, control of the computing system 100 can be passed from the main processor 104 to the auxiliary processor 106 via an interrupt signal. For example, when an error occurs with respect to the main processor 104, an interrupt signal can be generated. The auxiliary processor 106 can detect the interrupt signal via the interface 108 between the main processor 104 and the auxiliary processor 106.

The auxiliary processor 106 is shown with an interrupt handler 122. The interrupt handler 122 can include instructions that are executable by the auxiliary processor 106 in response to detecting the interrupt signal that is generated when the main processor 104 fails. At least some of the functionality that is described herein in connection with the auxiliary processor 106 can be performed via execution of the interrupt handler 122. For example, execution of the interrupt handler 122 can cause the data 120 in the persistent memory region 118 of the volatile memory 114 to be transferred to the non-volatile memory 116.

In some embodiments, the interrupt handler 122 can be stored in non-volatile memory 124 in the auxiliary processor 106. Alternatively, the interrupt handler 122 can be stored in another location (either internal or external to the SoC 102) that is accessible to the auxiliary processor 106.

As noted above, the techniques disclosed herein can be implemented using firmware. In some embodiments, the interrupt handler 122 can be included as part of the firmware of the computing system 100.

In some embodiments, the persistent memory region 118 of the volatile memory 114 can be implemented as a software defined NVDIMM. The term "software defined NVDIMM" can refer to an implementation of an NVDIMM in which software enables a portion of volatile memory to function as an NVDIMM. For example, referring to the embodiment shown in FIG. 1, the persistent memory region 118 of the volatile memory 114 can be a portion of the volatile memory 114 that is allocated for use as an NVDIMM. Thus, a portion of the volatile memory 114 can be used in the same way that an actual hardware NVDIMM would be used. The techniques disclosed herein prevent loss of the data 120 that is stored in the software defined NVDIMM in the event of a failure of the main processor 104.

In other words, the techniques disclosed herein enable one or more regions (e.g., the persistent memory region 118) of standard volatile memory 114 (e.g., DRAM) to be used as NVDIMM memory because the data 120 that is stored in those region(s) will not be lost when a crash occurs. Advantageously, allocating standard volatile memory 114 as NVDIMM memory results in significantly reduced latency.

The SoC 102 is intended to represent a single integrated circuit (or chip). Thus, in the depicted embodiment, all of the components that are shown as part of the SoC 102 (namely the main processor 104, the auxiliary processor 106, the volatile memory interface 110, the non-volatile memory interface 112, and the bridge 126) are included on a single silicon die, from which the SoC 102 is formed.

As noted above, an ARM-based architecture includes a main processor and one or more auxiliary processors. Thus, an ARM-based architecture could be used to implement the techniques disclosed herein. In some embodiments, the SoC 102 could include an implementation of an ARM-based architecture.

As noted above, both the main processor 104 and the auxiliary processor 106 can include one or more processor cores. In embodiments where the SoC 102 is an implementation of an ARM architecture, both the main processor 104 and the auxiliary processor 106 can include one or more ARM cores.

The auxiliary processor 106 can be configured to monitor the health of the main processor 104 to ensure that the main processor 104 is operating correctly. The auxiliary processor 106 can also be configured to determine various kinds of information with respect to the main processor 104. For example, the auxiliary processor 106 can be configured to have access to sensor data from sensors located on the main processor 104. This sensor data can include, but is not limited to, data from temperature sensors located on the main processor 104.

The auxiliary processor 106 can be configured to take certain actions that keep the main processor 104 working properly. For example, the voltage regulators that are powering the processor cores within the main processor 104 can be controlled by the auxiliary processor 106. The auxiliary processor 106 can also be responsible for maintaining consistent data for the processor cores on the main processor 104. This can include, but is not limited to, maintaining cache coherency with respect to the main processor 104.

As discussed above, when an error occurs that makes the main processor 104 inoperable, control can be passed to the auxiliary processor 106. In other words, the handling of catastrophic errors that occur with respect to the main processor 104 can be performed by the auxiliary processor 106.

There are many different types of errors that can cause the main processor 104 to be inoperable. Some examples of such errors include uncorrectable errors on cache lines and malfunctioning of voltage regulators (VRs).

The auxiliary processor 106 can be configured so that it performs one or more mitigation operations when a catastrophic error occurs on the main processor 104 and control is passed to the auxiliary processor 106. The mitigation operations can include (but are not limited to) causing the computing system 100 to be rebooted. Before causing the computing system 100 to be rebooted, the auxiliary processor 106 can cause the data 120 in the persistent memory region 118 of the volatile memory 114 to be transferred to the non-volatile memory 116, as discussed above. The auxiliary processor 106 can also perform other mitigation operations in some cases.

In some embodiments, the computing system 100 can include a baseboard management controller (BMC) 132, and the auxiliary processor 106 can be communicatively coupled to the BMC 132. The BMC 132 can be a specialized microcontroller within the computing system 100. The BMC 132 can be separate from the main processor 104 and the auxiliary processor 106. The BMC 132 can also be separate from the SoC 102. The BMC 132 can permit system administrators to perform various tasks remotely. For example, the BMC 132 can be configured so that a system administrator can remotely communicate with the BMC 132 to take corrective actions, such as resetting or power cycling the computing system 100.

The auxiliary processor 106 can be configured to report events, such as events involving the main processor 104, to the BMC 132. For example, when errors occur with respect to the main processor 104, the auxiliary processor 106 can report such errors to the BMC 132.

The term "storage class memory" refers to a memory and storage technology that provides persistent storage but that is much faster than traditional non-volatile storage (e.g., flash memory). The persistent memory region 118 in the volatile memory 114 is an example of storage class memory (SCM). The persistent memory region 118 may alternatively be referred to as an SCM carveout region.

The specific configuration of the computing system 100 shown in FIG. 1 is provided for purposes of example only and should not be interpreted as limiting the scope of the present disclosure. Other configurations are also possible for implementing the techniques disclosed herein. For example, in some alternative embodiments, a persistent memory region can be implemented in volatile memory that is located on an SoC having a main processor and an auxiliary processor (as opposed to being implemented in volatile memory 114 that is external to the SoC 102, as in the depicted embodiment). As another example, in some alternative embodiments, data in a persistent memory region can be transferred to non-volatile memory located on an SoC having a main processor and an auxiliary processor (as opposed to being transferred to non-volatile memory 116 that is external to the SoC 102, as in the depicted embodiment).

Combinations of these embodiments are also possible. For example, in some alternative embodiments, a persistent memory region can be implemented partially in volatile memory that is external to an SoC having a main processor and an auxiliary processor (as is the case with the persistent memory region 118 in the embodiment shown in FIG. 1) and partially in volatile memory that is located on the SoC. Alternatively, or in addition, a first portion of data in a persistent memory region can be transferred to non-volatile memory that is external to an SoC having a main processor and an auxiliary processor (such as the non-volatile memory 116 in the embodiment shown in FIG. 1), while a second portion of the data in the persistent memory region can be transferred to non-volatile memory that is located on the SoC.

In some embodiments, devices that are communicatively coupled to the non-volatile memory interface 112 can be memory mapped. For example, memory can be allocated to non-volatile memory devices (e.g., PCIe devices) that are communicatively coupled to the non-volatile memory interface 112. A transaction from an endpoint that is connected to a non-volatile memory device can read and write from the memory that has been allocated to it. Therefore, the non-volatile memory device can be described as being memory mapped. Memory mapping in this way provides data access to non-volatile memory devices.

Figure 2:
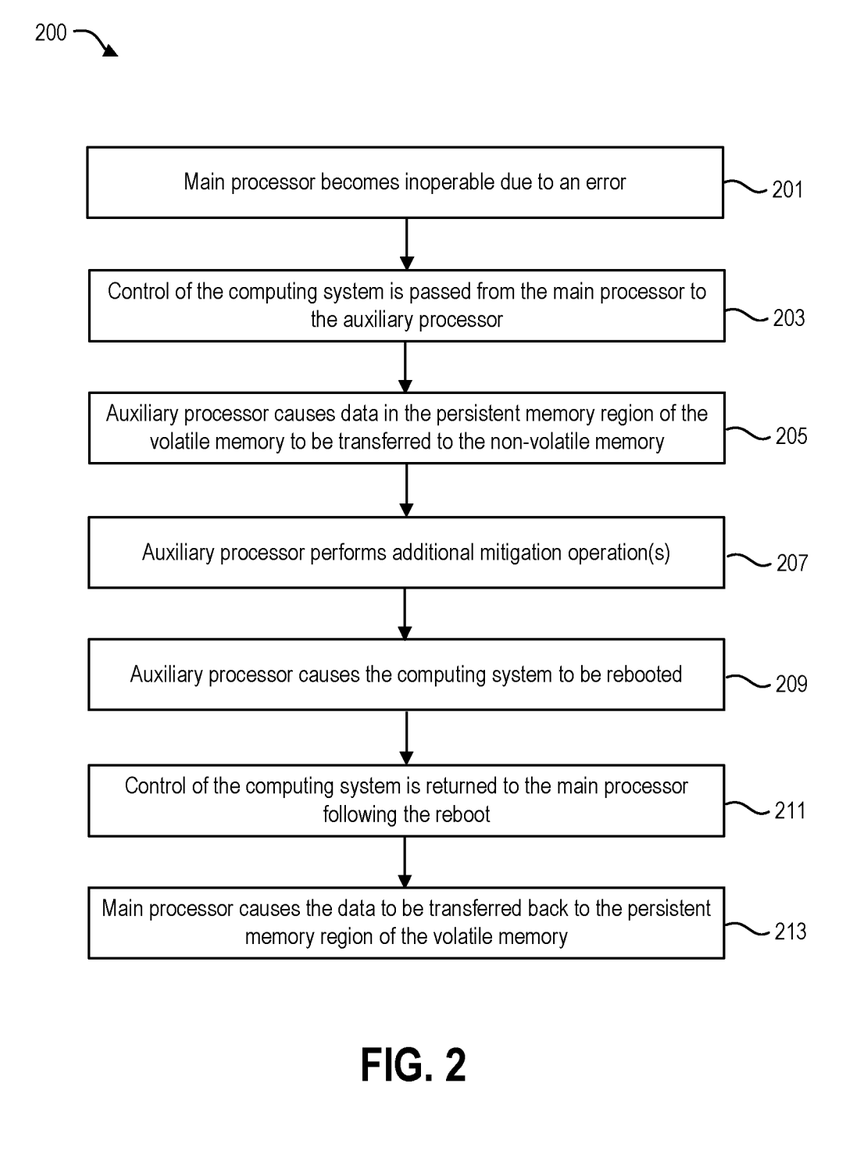
FIG. 2 illustrates an example of a method for enabling data in a persistent memory region in volatile memory to be preserved when a processor fails.

FIG. 2 illustrates an example of a method 200 that can be implemented by a computing system 100 in accordance with the present disclosure. More specifically, FIG. 2 illustrates an example of a method 200 for enabling data 120 in a persistent memory region 118 in volatile memory 114 to be preserved when a processor fails. The method 200 will be described in relation to the computing system 100 shown in FIG. 1.

At 201, an error can occur with respect to the main processor 104. The error can be a severe enough error that the main processor 104 becomes inoperable. For example, the error can be considered to be a catastrophic error (i.e., an error from which recovery is impossible).

At 203, in response to the main processor 104 becoming inoperable, control of the computing system 100 can be passed from the main processor 104 to the auxiliary processor 106. As discussed above, passing control from the main processor 104 to the auxiliary processor 106 can involve an interrupt signal. For example, when an error occurs with respect to the main processor 104, an interrupt signal can be generated. The auxiliary processor 106 can detect the interrupt signal via the interface 108 between the main processor 104 and the auxiliary processor 106.

At 205, in response to the main processor 104 becoming inoperable, the auxiliary processor 106 can cause the data 120 in the persistent memory region 118 of the volatile memory 114 to be transferred to the non-volatile memory 116. As discussed above, this transfer is possible because the volatile memory 114 still receives power even after the main processor 104 has become inoperable. Therefore, the data in the volatile memory 114 (including the data 120 in the persistent memory region 118 of the volatile memory 114) is still available even after the main processor 104 has become inoperable. Moreover, the auxiliary processor 106 is still able to access the data in the volatile memory 114 (including the data 120 in the persistent memory region 118 of the volatile memory 114) even after the main processor 104 has become inoperable.

To transfer the data 120 from the persistent memory region 118 of the volatile memory 114 to the non-volatile memory 116, the auxiliary processor 106 accesses both the volatile memory 114 and the non-volatile memory 116. The auxiliary processor 106 can access the volatile memory 114 (including the persistent memory region 118 of the volatile memory 114) via the volatile memory interface 110 and the bridge 126. The auxiliary processor 106 can access the non-volatile memory 116 via the non-volatile memory interface 112 and the bridge 126.

At 207, the auxiliary processor 106 can perform one or more additional mitigation operations in response to the error that has occurred with respect to the main processor 104. For example, the mitigation operation(s) can include reporting information to a BMC 132. The information that is reported to the BMC 132 can include information about the error that made the main processor 104 inoperable. The information that is reported to the BMC 132 can also include information about one or more other events that have occurred with respect to the main processor 104.

At 209, the auxiliary processor 106 can cause the computing system 100 to be rebooted. When the computing system 100 is rebooted, all of the data in the volatile memory 114 is lost. Thus, if the data 120 is not transferred to the non-volatile memory 116 before the computing system 100 is rebooted, the data 120 would be lost. However, because the auxiliary processor 106 is able to cause the data 120 to be transferred to the non-volatile memory 116 before the computing system 100 is rebooted, the data 120 can be preserved.

At 211, after the computing system 100 has been rebooted, control is once again returned to the main processor 104. At 213, the main processor 104 can cause the data 120 to be restored to the persistent memory region 118 of the volatile memory 114. More specifically, the main processor 104 can cause the data 120 to be transferred from the non-volatile memory 116 back to the persistent memory region 118 of the volatile memory 114.

Figure 3:
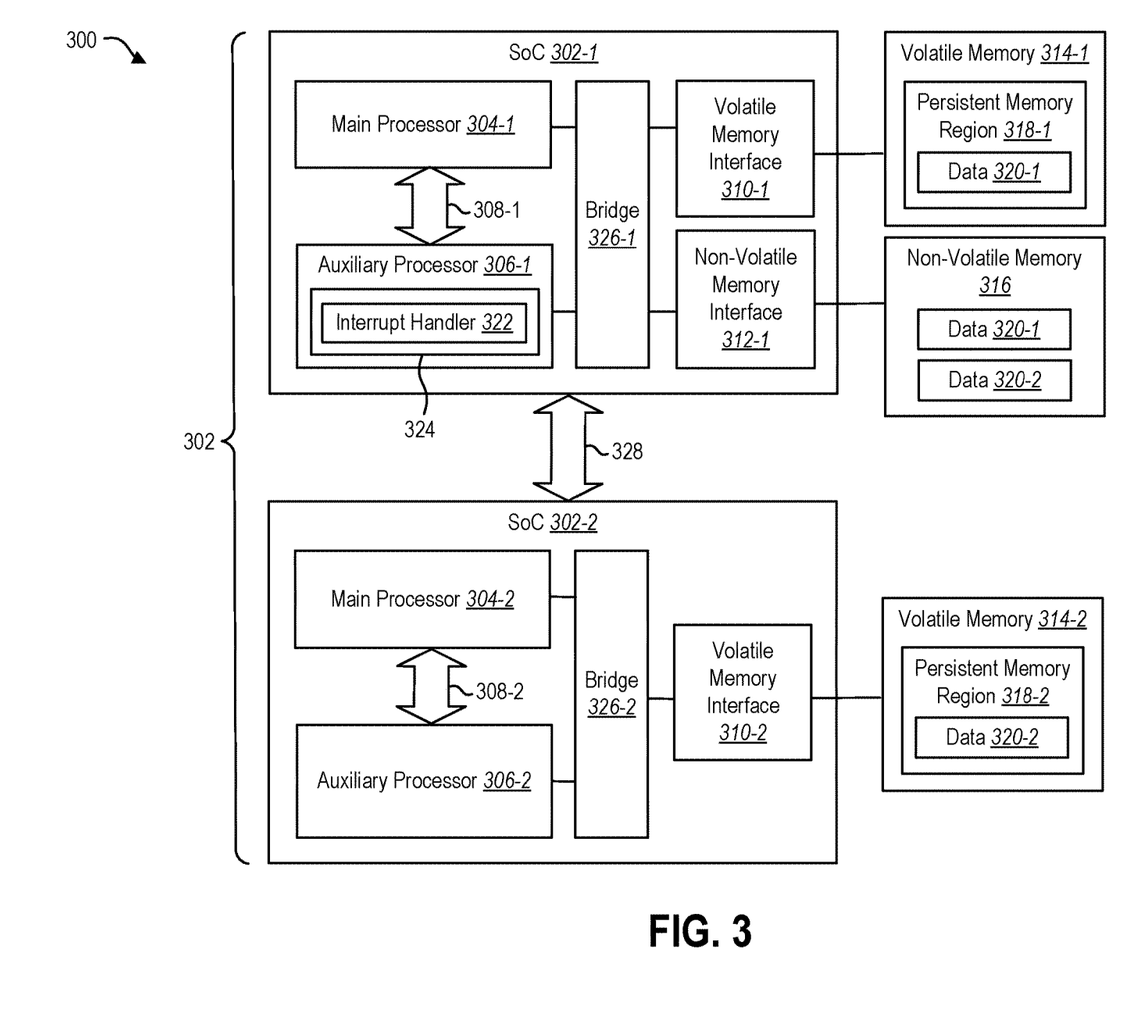
FIG. 3 illustrates another example of a computing system that can be configured to implement the techniques disclosed herein, the computing system including a plurality of SoCs.

In the embodiment shown in FIG. 1, the computing system 100 includes a single SoC 102. However, the techniques disclosed herein can be utilized in a computing system that includes a plurality of SoCs. FIG. 3 illustrates an example of a computing system 300 that includes a plurality of SoCs 302. In particular, the computing system 300 includes a first SoC 302-1 and a second SoC 302-2.

The SoCs 302 can be configured similarly to the SoC 102 that was described above in connection with FIG. 1. The first SoC 302-1 includes a main processor 304-1 and an auxiliary processor 306-1. The main processor 304-1 can be communicatively coupled to the auxiliary processor 306-1 via an interface 308-1. Similarly, the second SoC 302-2 includes a main processor 304-2 and an auxiliary processor 306-2. The main processor 304-2 can be communicatively coupled to the auxiliary processor 306-2 via an interface 308-2.

The computing system 300 includes a plurality of different modules of volatile memory. In particular, the computing system 300 includes volatile memory 314-1 and volatile memory 314-2. The computing system 300 also includes non-volatile memory 316.

Both the main processor 304-1 and the auxiliary processor 306-1 on the first SoC 302-1 are communicatively coupled to the volatile memory 314-1 and the non-volatile memory 316. In particular, the main processor 304-1 and the auxiliary processor 306-1 are communicatively coupled to the volatile memory 314-1 via a volatile memory interface 310-1 and the bridge 326-1. The main processor 304-1 and the auxiliary processor 306-1 are communicatively coupled to the non-volatile memory 316 via the non-volatile memory interface 312-1 and the bridge 326-1.

Both the main processor 304-1 and the auxiliary processor 306-1 on the first SoC 302-1 are also communicatively coupled to the volatile memory 314-2. In particular, the main processor 304-1 and the auxiliary processor 306-1 are communicatively coupled to the volatile memory 314-2 via the interconnect 328 between the first SoC 302-1 and the second SoC 302-2.

Both the main processor 304-2 and the auxiliary processor 306-2 on the second SoC 302-2 are also communicatively coupled to the volatile memory 314-1 and the non-volatile memory 316. In particular, the main processor 304-2 and the auxiliary processor 306-2 are communicatively coupled to the volatile memory 314-1 and the non-volatile memory 316 via the interconnect 328 between the first SoC 302-1 and the second SoC 302-2.

The main processor 304-2 and the auxiliary processor 306-2 on the second SoC 302-2 are also communicatively coupled to the volatile memory 314-2. In particular, the main processor 304-2 and the auxiliary processor 306-2 are communicatively coupled to the volatile memory 314-2 via the volatile memory interface 310-2 and the bridge 326-2.

Thus, the first SoC 302-1 is directly coupled to the volatile memory 314-1 and the non-volatile memory 316, and indirectly coupled (via the interconnect 328) to the volatile memory 314-2. On the other hand, the second SoC 302-2 is directly coupled to the volatile memory 314-2 and indirectly coupled (via the interconnect 328) to the volatile memory 314-1 and the non-volatile memory 316.

In the depicted embodiment, there are a plurality of different persistent memory regions in the computing system 300. In particular, there is a persistent memory region 318-1 in the volatile memory 314-1 and a persistent memory region 318-2 in the volatile memory 314-2. Data 320-1 can be stored in the persistent memory region 318-1, and data 320-2 can be stored in the persistent memory region 318-2.

To preserve the data 320-1, 320-2 in the persistent memory regions 318-1, 318-2 when the computing system 300 is rebooted, a processor can cause the data 320-1, 320-2 to be transferred from the persistent memory regions 318-1, 318-2 of the volatile memory 314-1, 314-2 to the non-volatile memory 316 before the computing system 300 reboots. Under normal circumstances, when the main processor 304-1 on the first SoC 302-1 is functioning properly, the main processor 304-1 can perform this function. Under some circumstances, however, the main processor 304-1 can experience a failure such that the main processor 304-1 is unavailable to perform this function.

The computing system 300 can be configured so that when an error occurs with respect to the main processor 304-1 and the main processor 304-1 becomes inoperable, control of the computing system 300 is passed from the main processor 304-1 to the auxiliary processor 306-1 on the first SoC 302-1. In response to the failure of the main processor 304-1, the auxiliary processor 306-1 can cause the data 320-1, 320-2 in the persistent memory regions 318-1, 318-2 of the volatile memory 314-1, 314-2 to be transferred to the non-volatile memory 316.

Thus, in the embodiment shown in FIG. 3, the auxiliary processor 306-1 causes data 320-1, 320-2 from a plurality of different locations to be transferred to non-volatile memory 316. The plurality of different locations include volatile memory 314-1 to which the SoC 302-1 is directly coupled as well as volatile memory 314-2 to which the SoC 302-1 is indirectly coupled.

At some point after the data 320-1, 320-2 has been safely transferred to the non-volatile memory 316, the auxiliary processor 306-1 can then cause the computing system 300 to be rebooted. Once the computing system 300 has been rebooted, the data 320-1, 320-2 can be transferred from the non-volatile memory 316 back to the persistent memory regions 318-1, 318-2 of the volatile memory 314-1, 314-2.

The auxiliary processor 306-1 is shown with an interrupt handler 322. The interrupt handler 322 can include instructions that are executable by the auxiliary processor 306-1 in response to detecting an interrupt signal that is generated when the main processor 304-1 fails. At least some of the functionality that is described herein in connection with the auxiliary processor 306-1 can be performed via execution of the interrupt handler 322. For example, execution of the interrupt handler 322 can cause the data 320-1, 320-2 in the persistent memory regions 318-1, 318-2 of the volatile memory 314-1, 314-2 to be transferred to the non-volatile memory 316.

The specific configuration of the computing system 300 shown in FIG. 3 is provided for purposes of example only and should not be interpreted as limiting the scope of the present disclosure. Other configurations are also possible for implementing the techniques disclosed herein. For example, in some alternative embodiments, a persistent memory region may be created in only one of the volatile memory modules (e.g., in either the volatile memory 314-1 or the volatile memory 314-2). As another example, in some alternative embodiments, the second SoC 302-2 can also be directly coupled to non-volatile memory, and at least some of the data 320-1, 320-2 from the persistent memory regions 318-1, 318-2 can be transferred to that non-volatile memory as well as to the non-volatile memory 316 that is coupled to the first SoC 302-1.

In the embodiments that have been described to this point, each SoC has been depicted with a single main processor and a single auxiliary processor. For example, the SoC 102 in FIG. 1 includes a single main processor 104 and a single auxiliary processor 106. The SoCs 302-1, 302-2 in FIG. 3 are depicted similarly. In some embodiments, however, a computing system can include an SoC that includes a main processor and a plurality of auxiliary processors.

Figure 4:
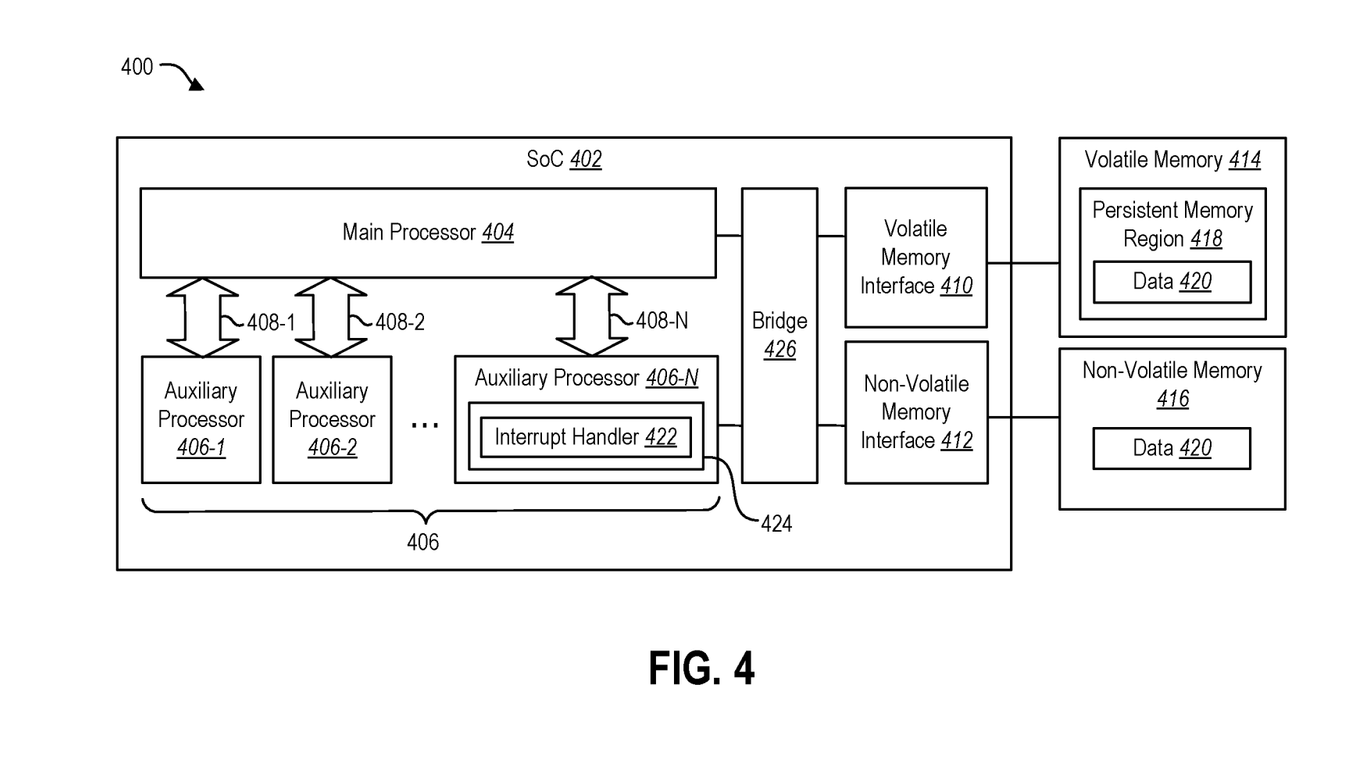
FIG. 4 illustrates an example of a computing system with a system on a chip (SoC) that includes a main processor and a plurality of auxiliary processors.

FIG. 4 illustrates an example of a computing system 400 with an SoC 402 that includes a main processor 404 and a plurality of auxiliary processors 406. More specifically, FIG. 4 shows the SoC 402 with a first auxiliary processor 406-1, a second auxiliary processor 406-2, and an Nth auxiliary processor 406-N.

The main processor 404 can be communicatively coupled to the first auxiliary processor 406-1 via a first interface 408-1. The main processor 404 can be communicatively coupled to the second auxiliary processor 406-2 via a second interface 408-2. The main processor 404 can be communicatively coupled to the Nth auxiliary processor 406-N via an Nth interface 408-N. In an alternative embodiment, the plurality of auxiliary processors 408 can each be coupled to the main processor 404 via the same interface.

In some embodiments, the auxiliary processors 406 can be configured to perform different functions. The Nth auxiliary processor 406-N can be configured similarly to the auxiliary processor 106 in the computing system 100 shown in FIG. 1. For example, the Nth auxiliary processor 406-N can be configured to cause data 420 in a persistent memory region 418 of volatile memory 414 to be transferred to non-volatile memory 416 when the main processor 404 becomes inoperable. The other auxiliary processors 406-1, 406-2 can be configured to perform different functions. The functions performed by the other auxiliary processors 406-1, 406-2 can be related to monitoring the health of the main processor 404 and ensuring that the main processor 404 is operating correctly.

The Nth auxiliary processor 406-N is shown with an interrupt handler 422, which can be similar to the interrupt handler 122 in the computing system 100 shown in FIG. 1. In some embodiments, the interrupt handler 422 can be stored in non-volatile memory 424 in the Nth auxiliary processor 406-N. Alternatively, the interrupt handler 422 can be stored in another location (either internal or external to the SoC 402) that is accessible to the Nth auxiliary processor 406-N.

Like the SoC 102 described previously, the SoC 402 includes a volatile memory interface 410, a non-volatile memory interface 412, and a bridge 426. The volatile memory interface 410 communicatively couples the volatile memory 414 to the main processor 404 and the auxiliary processor 406 via the bridge 426. The non-volatile memory interface 412 communicatively couples the non-volatile memory 416 to the main processor 404 and the auxiliary processor 406 via the bridge 426.

In some embodiments, the techniques disclosed herein can be utilized by a cloud computing provider. For example, the servers in a cloud computing provider's datacenters can be configured to implement the techniques disclosed herein.

Cloud computing is the delivery of computing services over the internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

Broadly speaking, a cloud computing system includes two sections, a front end and a back end, that are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

Figure 5:
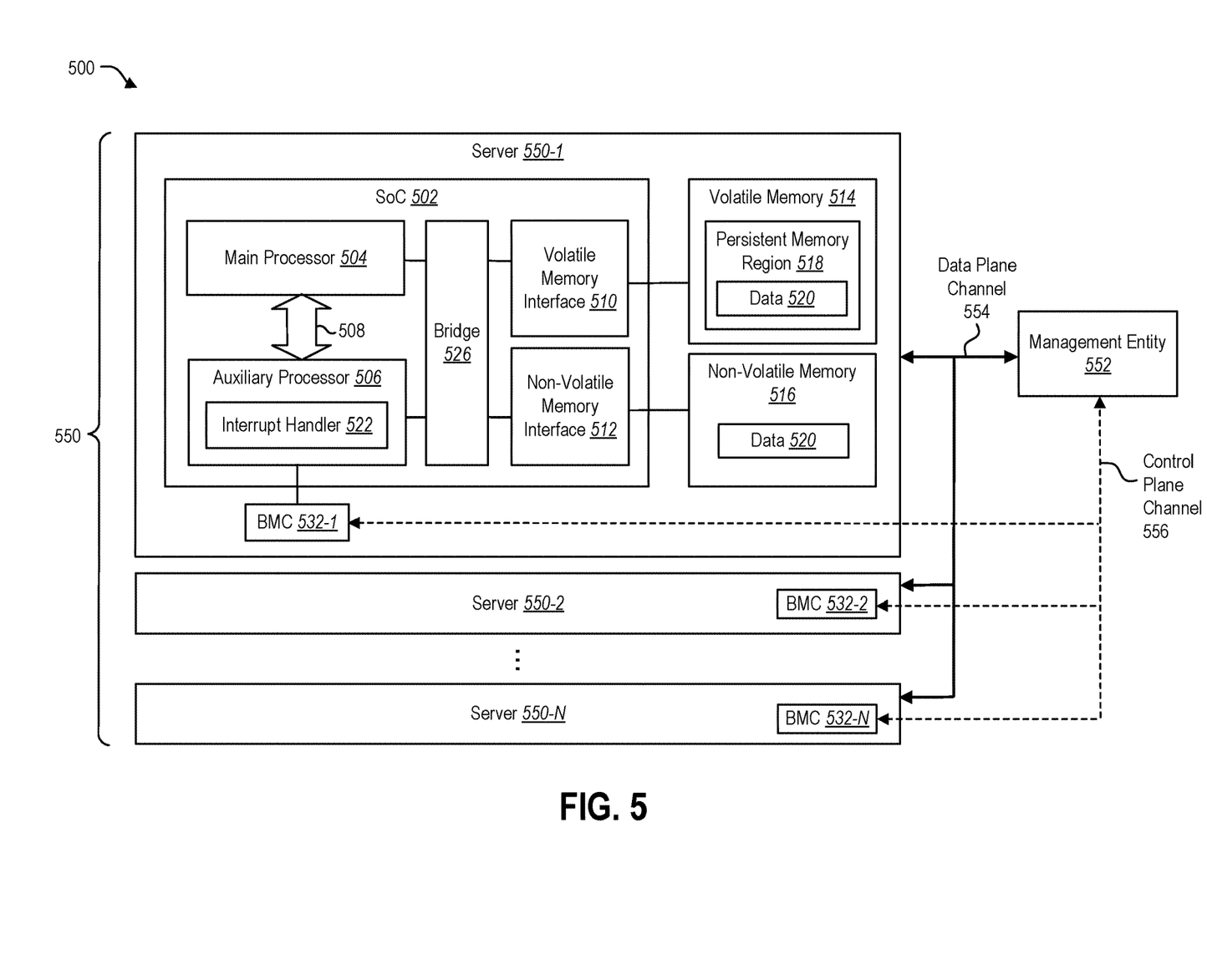
FIG. 5 illustrates an example of a cloud computing system that can be configured to implement the techniques disclosed herein.

FIG. 5 illustrates aspects of a cloud computing system 500 that can be configured to implement the techniques disclosed herein. The aspects of the cloud computing system 500 shown in FIG. 5 include aspects of the back end of the cloud computing system 500.

The cloud computing system 500 includes a plurality of servers 550. Each of the servers 550 can be configured similarly to any of the computing systems described herein (e.g., the computing systems 100, 300, 400 shown in FIGS. 1, 3, and 4). The servers 550 can be included in one or more datacenters. The servers 550 can be stacked in racks.

A first server 550-1 is shown with an SoC 502 having a main processor 504 that is communicatively coupled to an auxiliary processor 506 via an interface 508.

A volatile memory interface 510 communicatively couples volatile memory 514 to the main processor 504 and to the auxiliary processor 506 via a bridge 526. A non-volatile memory interface 512 communicatively couples non-volatile memory 516 to the main processor 504 and to the auxiliary processor 506 via the bridge 526. The auxiliary processor 506 is also communicatively coupled to a BMC 532-1. These components can operate similarly to the corresponding components in any of the computing systems described herein.

Similar to the other computing systems described herein, the auxiliary processor 506 can be configured to cause data 520 in a persistent memory region 518 of the volatile memory 514 to be transferred to the non-volatile memory 516 when the main processor 504 becomes inoperable. The auxiliary processor 506 is shown with an interrupt handler 522, which can be similar to the interrupt handler 122 in the computing system 100 shown in FIG. 1.

Additional servers 550-2 . . . 550-N are shown in FIG. 5. Each of these servers 550-2 . . . 550-N can be configured similarly to the server 550-1.

The servers 550 within a cloud computing system 500 can be communicatively coupled to a management entity 552. The management entity 552 can be configured to perform management operations with respect to the servers 550 of the cloud computing system 500. In some embodiments, the management entity 552 can include a fabric controller, a rack controller, or combinations thereof.

There can be at least two different communication channels between the management entity 552 and the servers 550 in the cloud computing system 500. A first communication channel can be established via a data plane. This communication channel may be referred to herein as a data plane channel 554. In some embodiments, the data plane channel 554 can facilitate communication between the management entity 552 and the servers 550 via one or more computer networks. A second communication channel can be established via a control plane. This communication channel may be referred to herein as a control plane channel 556. The control plane channel 556 facilitates communication between the management entity 552 and the BMCs on the servers 550. In particular, FIG. 5 shows the control plane channel 556 facilitating communication between the management entity 552 and the BMC 532-1 on the server 550-1, the BMC 532-2 on the server 550-2, and the BMC 532-N on the server 550-N.

The data plane channel 554 can be considered to be a primary communication channel between the management entity 552 and the servers 550. The control plane channel 556 can be considered to be a secondary communication channel (or an out-of-band communication channel) between the management entity 552 and the servers 550.

When the servers 550 are not accessible via the data plane channel 554, the management entity 552 may still be able to communicate with the servers 550 via the control plane channel 556. For example, if a particular server 502-1 crashes and becomes unresponsive via the data plane channel 554, the management entity 552 may be able to restart the server 502-1 by sending one or more commands to the BMC 532-1 via the control plane channel 556.

Advantageously, the techniques disclosed herein can be implemented using firmware. In some embodiments, a management entity 552 can distribute a firmware update to a plurality of servers 550. The firmware update can configure the plurality of servers 550 to implement the techniques disclosed herein. In some embodiments, the firmware update can cause an interrupt handler 522 to be installed on the servers 550.

As noted above, ARM-based servers can be configured to implement the techniques disclosed herein. As also noted above, ARM-based servers are becoming more attractive for cloud computing providers. In some embodiments, the SoCs in the servers 550 in the cloud computing system 500 (e.g., the SoC 502 in the server 550-1) can include an implementation of an ARM-based architecture.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet.

There are many different types of services that cloud computing providers (e.g., public cloud providers) can offer to customers. One type of cloud computing service is referred to as Infrastructure as a Service (IaaS). IaaS is a form of cloud computing that delivers compute, network, and storage resources to consumers on-demand, over the Internet. IaaS enables end users to scale and shrink resources on an as-needed basis, reducing the need for large, up-front capital expenditures. This can be particularly beneficial for users who anticipate having variable workloads. In some embodiments, the cloud computing system 500 can be configured to provide a public cloud that offers IaaS services to customers.

There can be several important technical benefits to implementing the techniques disclosed herein in a cloud computing system 500 that provides IaaS services to customers. For example, as discussed above, the techniques disclosed herein enable one or more regions (e.g., the persistent memory region 518) of standard volatile memory 514 (e.g., DRAM) to be used as persistent memory (e.g., NVDIMM memory) because the data 520 that is stored in those region(s) will not be lost when a crash occurs. Thus, the techniques disclosed herein enable a cloud computing provider to offer storage resources to customers (e.g., storage class memory) that are more reliable and resilient than those offered by other cloud computing providers that do not implement the disclosed techniques.

As discussed above, the techniques disclosed herein can be implemented in servers that utilize processor architectures (e.g., ARM-based architectures) in which there is a main processor and one or more auxiliary processors. However, some cloud computing providers utilize servers that do not include this type of configuration. For example, some cloud computing providers utilize servers that include x86 processor architectures, and x86 processor architectures do not include both a main processor and an auxiliary processor. The techniques disclosed herein can provide technical benefits to cloud computing providers that utilize ARM-based servers compared to their counterparts that utilize x86 processor architectures. ARM-based servers can be highly cloud customized, as described herein. The reliability of storage class memory on these servers can be higher as they can mitigate CPU catastrophic errors compared to an x86 based or other similar architecture.

Additional explanation will now be provided about some of the terms that have been used in the foregoing discussion.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" can refer to any electronic component capable of storing electronic information. Examples of memory include volatile memory, non-volatile memory, and persistent memory.

Volatile memory is memory that requires power to maintain the stored information. Volatile memory retains its contents while powered on but loses its contents when the power is interrupted. Some examples of volatile memory include static random access memory (SRAM) and dynamic random access memory (DRAM).

Non-volatile memory is memory that can retain stored information even after power is removed. As used herein, the term non-volatile memory can include non-volatile storage. Some examples of non-volatile memory include flash memory, read-only memory (ROM), programmable read-only memory (PROM), erasable programmable read-only memory (EPROM), electrically erasable PROM (EEPROM), non-volatile RAM, ferroelectric RAM, magnetic computer storage devices (e.g., hard disk drives), optical storage devices, and registers.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Firmware is a specific class of computer software that provides low-level control for the hardware of a computing system. Firmware can be stored in non-volatile memory devices such as read-only memory (ROM), erasable programmable ROM (EPROM), or electrically erasable programmable ROM (EEPROM). Firmware can be used to perform hardware initialization during a boot sequence of a computing system, and also to provide runtime services for operating systems and programs. Examples of firmware include the Basic Input/Output System (BIOS) and the Unified Extensible Firmware Interface (UEFI).

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Memory is said to be communicatively coupled to a processor if the processor can read information from and/or write information to the memory. Memory that is integral to a processor is communicatively coupled to the processor.

The term "determining" (and grammatical variants thereof) can encompass a wide variety of actions. For example, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The term "interface" can refer to a shared boundary across which two or more separate components of a computing system can exchange information. An interface can include hardware component(s) and/or software component(s).

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing system, comprising:
   volatile memory comprising a persistent memory region;
   non-volatile memory; and
   a system on a chip (SoC) being implemented on an integrated circuit, the SOC comprising:
     a main processor on the integrated circuit that is communicatively coupled to both the volatile memory and the non-volatile memory;
     an auxiliary processor on the integrated circuit;
     a bridge on the integrated circuit coupled between (1) the main processor and the auxiliary processor and (2) the volatile memory and the non-volatile memory, wherein the main processor and the auxiliary processor are communicatively coupled to both the volatile memory and the non-volatile memory via the bridge; and
     instructions that are executable by the auxiliary processor to cause data in the persistent memory region of the volatile memory to be transferred to the non-volatile memory via the bridge in response to the auxiliary processor detecting a failure of the main processor.

2. The computing system of claim 1, wherein the SoC further comprises:
   a volatile memory interface on the integrated circuit that communicatively couples the volatile memory to the main processor and the auxiliary processor; and
   a non-volatile memory interface on the integrated circuit that communicatively couples the non-volatile memory to the main processor and the auxiliary processor.

3. The computing system of claim 1, wherein the persistent memory region comprises a software defined non-volatile dual in-line memory module (NVDIMM).

4. The computing system of claim 1, wherein the SoC comprises an implementation of an Advanced Reduced Instruction Set Computer (RISC) Machines (ARM) architecture.

5. The computing system of claim 1,
   wherein the main processor comprises a central processing unit (CPU), and
   wherein the auxiliary processor monitors performance of the main processor by one or more of monitoring sensor data of the main processor, controlling a voltage regulator of the main processor, and maintaining cache coherency with respect to the main processor.

6. The computing system of claim 1, wherein the main processor and the auxiliary processor are both included on a same silicon die from which the SoC is formed.

7. The computing system of claim 1, further comprising an interface that communicatively couples the main processor to the auxiliary processor.

8. The computing system of claim 1,
   wherein the volatile memory is directly coupled to the SoC,
   wherein the computing system further comprises an additional SoC that is directly coupled to additional volatile memory,
   wherein the additional volatile memory comprises an additional persistent memory region, and
   wherein the instructions are additionally executable by the auxiliary processor to cause additional data in the additional persistent memory region to be transferred to the non-volatile memory in response to the failure of the main processor.

9. The computing system of claim 1, wherein the SoC comprises a plurality of auxiliary processors.

10. A system on a chip (SoC) implemented on an integrated circuit, the SoC comprising:
    a main processor on the integrated circuit that is communicatively coupled to both a volatile memory and a non-volatile memory;
    an auxiliary processor on the integrated circuit;
    a bridge on the integrated circuit coupled between (1) the main processor and the auxiliary processor and (2) the volatile memory and the non-volatile memory, wherein the main processor and the auxiliary processor are communicatively coupled to both the volatile memory and the non-volatile memory via the bridge; and
    instructions that are executable by the auxiliary processor to cause data in a persistent memory region of the volatile memory to be transferred to the non-volatile memory via the bridge in response to the auxiliary processor detecting a failure of the main processor.

11. The SoC of claim 10, further comprising:
    a volatile memory interface on the integrated circuit that communicatively couples the volatile memory to the main processor and the auxiliary processor; and
    a non-volatile memory interface on the integrated circuit that communicatively couples the non-volatile memory to the main processor and the auxiliary processor.

12. The SoC of claim 10, wherein the persistent memory region comprises a software defined non-volatile dual in-line memory module (NVDIMM).

13. The SoC of claim 10, wherein the SoC comprises an implementation of an Advanced Reduced Instruction Set Computer (RISC) Machines (ARM) architecture.

14. The SoC of claim 10, wherein the main processor is communicatively coupled to the auxiliary processor via a high-speed bus.

15. The SoC of claim 10, wherein the main processor and the auxiliary processor are both included on a same silicon die from which the SoC is formed.

16. The SoC of claim 10,
    wherein the main processor comprises a central processing unit (CPU), and
    wherein the auxiliary processor monitors performance of the main processor by one or more of monitoring sensor data of the main processor, controlling a voltage regulator of the main processor, and maintaining cache coherency with respect to the main processor.

17. A method for enabling data stored in a persistent memory region in volatile memory to be preserved when a main processor on a computing system fails, the method being performed by an auxiliary processor that is located on a same system on a chip (SoC) as the main processor, the SoC being implemented on an integrated circuit, the method comprising:
    detecting, by the auxiliary processor, that the main processor is operating incorrectly;
    receiving, at the auxiliary processor, control of the computing system from the main processor on the integrated circuit based on detecting that the main processor is operating incorrectly;

upon receiving control of the computing system, causing, by the auxiliary processor, the data in the persistent memory region of the volatile memory to be transferred to non-volatile memory via a bridge on the SoC, the bridge on the integrated circuit being coupled between (1) the main processor and the auxiliary processor and (2) the volatile memory and the non-volatile memory, wherein the main processor and the auxiliary processor are communicatively coupled to both the volatile memory and the non-volatile memory via the bridge; and causing the computing system to be rebooted after the data has been transferred to the non-volatile memory.

18. The method of claim 17, wherein the SoC comprises a volatile memory interface that communicatively couples the volatile memory to the main processor and the auxiliary processor;

wherein the SoC further comprises a non-volatile memory interface that communicatively couples the non-volatile memory to the main processor and the auxiliary processor, and wherein causing the data to be transferred to the non-volatile memory comprises:

accessing the volatile memory via the volatile memory interface; and accessing the non-volatile memory via the non-volatile memory interface.

19. The method of claim 17, wherein detecting that the main processor is operating incorrectly is based on detecting an interrupt signal via an interface between the main processor and the auxiliary processor.

20. The method of claim 17, further comprising reporting error information to a baseboard management controller (BMC).

\* \* \* \* \*